US011938605B2

(12) United States Patent
Wang et al.

(10) Patent No.: US 11,938,605 B2
(45) Date of Patent: Mar. 26, 2024

(54) ELECTRIC TOOL

(71) Applicant: Nanjing Chervon Industry Co., Ltd., Nanjing (CN)

(72) Inventors: Huaishu Wang, Nanjing (CN); Tianxiao Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 156 days.

(21) Appl. No.: 17/237,566

(22) Filed: Apr. 22, 2021

(65) Prior Publication Data

US 2021/0362313 A1 Nov. 25, 2021

(30) Foreign Application Priority Data

May 22, 2020 (CN) ......................... 202010442229.6

(51) Int. Cl.
*B25D 16/00* (2006.01)
*B25F 5/02* (2006.01)

(52) U.S. Cl.
CPC .............. *B25D 16/006* (2013.01); *B25F 5/02* (2013.01); *B25D 2250/255* (2013.01)

(58) Field of Classification Search
CPC .... B25D 16/006; B25D 2250/255; B25F 5/02
USPC ............................................................ 173/47
See application file for complete search history.

(56) References Cited

U.S. PATENT DOCUMENTS

| | | | | |
|---|---|---|---|---|
| 5,440,215 A * | 8/1995 | Gilmore | B25F 5/001 | 388/930 |
| 7,789,169 B2 * | 9/2010 | Berry | B25C 1/06 | 173/217 |
| 9,014,933 B2 * | 4/2015 | Chen | B25B 23/14 | 701/68 |
| 10,549,396 B2 * | 2/2020 | Matsunaga | B25F 5/00 | |
| 2006/0238946 A1 * | 10/2006 | Schreckenberger | H02H 11/00 | 361/100 |
| 2014/0296020 A1 | 10/2014 | Chen | | |
| 2014/0352995 A1 | 12/2014 | Matsunaga | | |

(Continued)

FOREIGN PATENT DOCUMENTS

| | | |
|---|---|---|
| CN | 204538696 U | 8/2015 |
| CN | 106207971 A | 12/2016 |
| CN | 105739329 B | 4/2018 |

(Continued)

*Primary Examiner* — Robert F Long
*Assistant Examiner* — Xavier A Madison
(74) *Attorney, Agent, or Firm* — Greenberg Traurig, LLP

(57) ABSTRACT

An electric tool includes a housing, a motor, a tool interface, a control circuit, a master switch, and a protection circuit. The tool interface is configured to connect to a power supply to supply power to the motor. The master switch is disposed on a current path formed by the tool interface and the control circuit. The master switch has an on state in which electric connection between the tool interface and the control circuit is on and an off state in which the electric connection between the tool interface and the control circuit is off. The protection circuit is connected between the master switch and the control circuit and is configured to disconnect connection between the tool interface and the control circuit in response to the master switch being in the on state before the tool interface connects to the power supply.

17 Claims, 6 Drawing Sheets

(56) References Cited

U.S. PATENT DOCUMENTS

| | | | | |
|---|---|---|---|---|
| 2015/0084554 | A1* | 3/2015 | Tsuruta | B25F 5/00<br>318/139 |

FOREIGN PATENT DOCUMENTS

| | | | |
|---|---|---|---|
| CN | 109980625 | B | 10/2021 |
| EP | 3441191 | B1 | 3/2022 |
| WO | 2004073003 | A3 | 8/2004 |

* cited by examiner

ELECTRIC TOOL

RELATED APPLICATION INFORMATION

This application claims the benefit under 35 U.S.C. § 119(a) of Chinese Patent Application No. CN 202010442229.6, filed on May 22, 2020, which is incorporated by reference in its entirety herein.

BACKGROUND

For electric tools such as impact wrenches, angle grinders, or circular saws, an operation switch disposed on a housing is pressed to switch on a switch installed in the housing to drive a motor. In this case, in order to be more labor-saving for an operator in an operating process, a locking piece is typically provided on an operation member to maintain an on state of the switch. However, the electric tool will start automatically if power is on, a battery pack is plugged in, or a power line is plugged into an outlet while the power switch is in the on state. Since an operating piece of the electric tool has a high rotational speed, startup of the electric tool by a misoperation will cause injuries to the operator and existence of potential safety hazards.

SUMMARY

An example provides an electric tool. The electric tool includes a housing, a motor, a tool interface, a control system, a master switch, and a protection circuit. The motor is disposed in the housing. The tool interface is configured to connect to a power supply to supply power to the motor. The control system includes a control circuit and configured to control rotation of the motor. The master switch is disposed on a current path formed by the tool interface and the control circuit. The master switch has an on state in which electric connection between the tool interface and the control circuit is on and an off state in which the electric connection between the tool interface and the control circuit is off. The protection circuit is connected between the master switch and the control circuit. In response to the master switch being in the on state before the tool interface connects to the power supply, the protection circuit is configured to disconnect connection between the tool interface and the control circuit.

In an example, in response to the master switch being in the on state after the tool interface connects to the power supply, the protection circuit is configured to conduct the connection between the tool interface and the control circuit.

In an example, the protection circuit includes a first power supply branch, the first power supply branch includes a capacitor electrically connected to the master switch, and the capacitor is not powered on in response to the master switch being in the on state before the tool interface connects to the power supply.

In an example, the capacitor is powered on in response to the master switch being in the off state after the tool interface connects to the power supply, and the capacitor is configured to discharge in response to the master switch being in the on state after the tool interface connects to the power supply.

In an example, the first power supply branch further includes a first triode, at least one end of the first triode is connected to the capacitor, and the first triode is configured to turn on in response to the capacitor discharging.

In an example, the protection circuit further includes a first switching element, one end of the first switching element is connected to the first triode, and the first switching element is in an on state in response to the first triode being on.

In an example, the protection circuit further includes a second power supply branch, the second power supply branch is connected in series between the control circuit and the first switching element, and the second power supply branch is configured to maintain that the first switching element is on in response to the master switch being in the on state after the tool interface connects to the power supply.

In an example, in response to the master switch being in the on state after the tool interface connects to the power supply, the second power supply branch enables a first voltage terminal of the first switching element to receive a low level to maintain that the first switching element is on.

In an example, the control circuit includes a voltage sustain terminal, the voltage sustain terminal is configured to output a voltage signal in response to the first switching element being on, the second power supply branch includes a second triode and a third triode, one end of the second triode is connected to the voltage sustain terminal, the second triode is configured to turn on in response to receiving the voltage signal, one end of the third triode is connected to one end of the second triode, and the third triode is configured to turn on in response to the second triode turning on.

In an example, one end of the first switching element is connected to the third triode, and the first switching element is in the on state in response to the third triode turning on.

In an example, the control circuit includes a power conversion branch connected to the tool interface and configured to convert electric energy connected to the tool interface into different voltage outputs.

In an example, the control circuit further includes a control unit, and the control unit is configured to receive electric energy from the power conversion branch and output a drive signal to control the rotation of the motor.

In an example, the control unit includes a power input terminal and an enable input terminal. The power input terminal is configured to connect to a voltage provided by the power conversion branch. The enable input terminal is configured to, in response to detecting a high level, output a drive signal to control the motor to rotate. The protection circuit includes a second switching element. One end of the second switching element is electrically connected to the enable input terminal. The enable input terminal detects a low level in response to the second switching element turning on.

In an example, the control unit includes a first controller connected to the motor and configured to control the rotation of the motor. The control unit further includes a second controller. The second controller is communicatively connected to the first controller, and the second controller is configured to output a trigger signal to the first controller to enable the first controller to output a drive signal to control the motor rotation in response to the master switch being in the on state after the tool interface connects to the power supply.

In an example, the electric tool further comprises an operation switch for turning on or turning off the master switch, and the operation switch is a push switch being operated by a user to slide along a surface of the housing.

In an example, the operation switch is movable to a start position that allows the electric tool to start and an off position that prevents the electric tool from starting, and the operation switch is capable of being locked in the start position.

An example provides an angle grinder. The angle grinder includes a housing; a motor disposed in the housing; a tool interface configured to connect to a power supply to the motor; a control system comprising a control circuit and configured to control the rotation of the motor; and a master switch disposed on a current path formed by the tool interface and the control system, wherein the master switch has an on state in which electric connection between the tool interface and the control circuit is on and an off state in which the electric connection between the tool interface and the control circuit is off. The control system comprises a protection circuit connected between the master switch and the control circuit, in response to the master switch being in the on state before the tool interface connects to the power supply, the protection circuit is configured to disconnect connection between the tool interface and the control circuit.

In an example, in response to the master switch being in the on state after the tool interface connects to the power supply, the protection circuit is configured to conduct the connection between the tool interface and the control circuit.

In an example, the protection circuit comprises a first power supply branch, the first power supply branch comprises a capacitor electrically connected to the master switch, and the capacitor is not powered on in response to the master switch being in the on state before the tool interface connects to the power supply.

In an example, the angle grinder further comprises an operation switch for turning on or turning off the master switch, the operation switch is a push switch being operated by a user to slide along a surface of the housing, the operation switch is movable to a start position that allows the angle grinder to start and an off position that prevents the angle grinder from starting, and the operation switch is capable of being locked in the start position.

DETAILED DESCRIPTION

Figure 1:
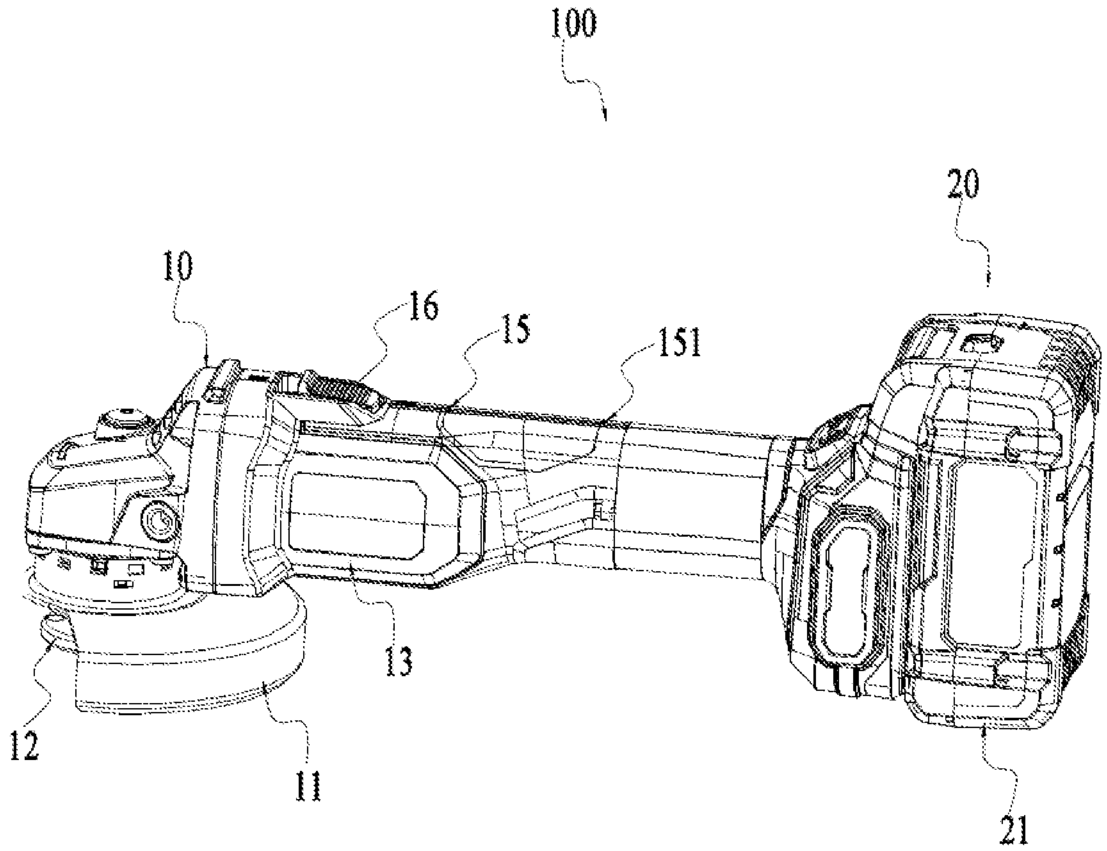
FIG. 1 is a perspective view of an electric tool according to an example.

An electric tool shown in FIG. 1 is an angle grinder 100 for grinding. The electric tool may also be other types of tools. The electric tool can be drill-type tools, such as an electric drill or a screwdriver. The electric tool may also be other grinding-type tools, such as a sander, a polishing machine, etc. The electric tool may also be saw-type tools, such as a circular saw, a curve saw, a reciprocating saw, etc. The electric tool can be other hand-held tools, such as a mixer, a blower, a chain saw, etc.

Figure 2:
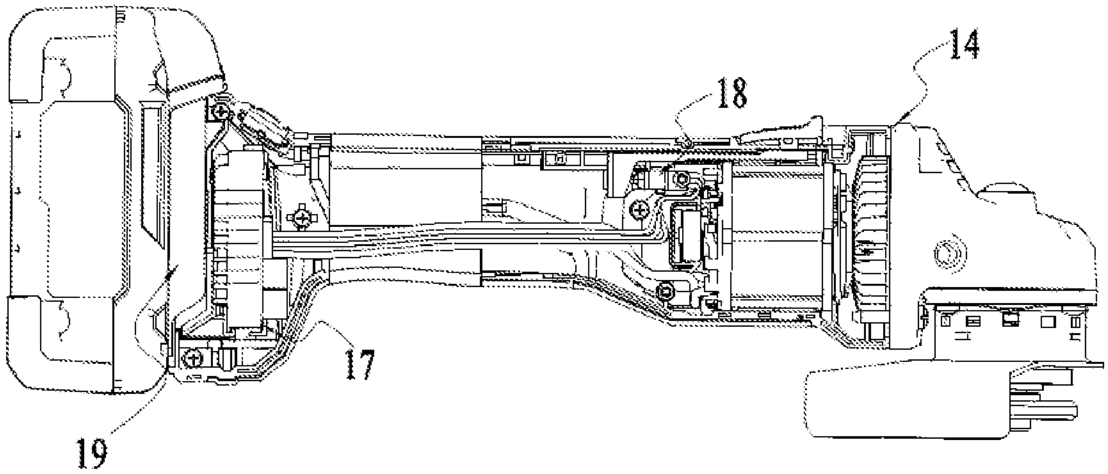
FIG. 2 is a section view of the electric tool of FIG. 1.

Referring to FIGS. 1 and 2, an angle grinder 100 includes a tool body 10 and a power supply 20.

The tool body 10 includes a shield 11, an output shaft 12, a motor 13, a transmission mechanism 14, a housing 15, and an operation switch 16 for a user to operate.

At least a portion of the shield 11 covers a grinding disc to achieve a protection function. The output shaft 12 is configured to mount or fix the grinding disc. The motor 13 is configured to drive the output shaft 12 to rotate. Specifically, the motor 13 includes a rotor, a stator, and a motor shaft, and the output shaft 12 is connected to the motor shaft via the transmission mechanism 14 which transmits a driving force of the motor 13 to the output shaft 12.

The housing 15 is formed with a head-housing space capable of accommodating the motor 13 and the transmission mechanism 14. The tool body 10 further includes a handle part 151, and the handle part 151 may be a separate part or formed by the housing 15 and may be held by a user to operate the angle grinder 100.

The handle part 151 is further provided with the operation switch 16 for starting or stooping the operation of the motor 13. The operation switch 16 may be a push switch or a trigger switch.

The power supply 20 is configured to provide electric energy to the angle grinder 100. In some examples, the angle grinder 100 is powered by using a direct current power supply, and more specifically, the angle grinder 100 is powered by using a battery pack. It is to be understood by those skilled in the art that the power supply 20 is not limited to the scenario where the battery pack 20 is used, and the power supply to each circuit element may also be implemented through mains supply or alternating current power supply which are cooperated with a corresponding rectifying circuit, filtering circuit, and voltage regulating circuit.

In addition, a lower end of the handle part 151 of the angle grinder 100 is further provided with a tool fitting part and a tool interface 19 which are configured to be detachably connected to the power supply 20. In some examples, the tool fitting part is provided such that the power supply 20 can be detached therefrom when a user slides the power supply 20 toward the front of the tool body 10 of the angle grinder 100. Correspondingly, the power supply 20 is provided with a power supply interface and a power supply fitting part which are respectively fitted to the tool interface 19 and the tool fitting part.

The tool body 10 further includes a control system 17 and a master switch 18, and the tool interface 19 electrically connects the power supply 20 to the control system 17.

The control system 17 is configured to control rotation of the motor 13. In some examples, the control system 17 is disposed at the bottom of the handle part 151. It is to be understood that the control system 17 may be disposed anywhere within the tool body 10 based on a shape and a size of the electric tool. In some examples, the control system 17 further includes associated circuits and components that support functions of variable-speed governing and forward/backward motion of the angle grinder 100. In some examples, the control system 17 is disposed on a single printed circuit board, and the control system 17 may also be disposed on multiple circuit boards electrically coupled together.

The master switch 18 is disposed on a current path on which the tool interface 19 and the control system 17 are provided. Specifically, the master switch 18 is connected between the tool interface 19 and the control system 17, and the master switch 18 has an on state in which electric connection between the tool interface 19 and the control system 17 is on and an off state in which the electric connection between the tool interface and the control system

17 is off. The master switch 18 is electrically connected to the control system 17 through a control wire. The operation switch 16 is configured to move on a housing of the tool body to turn on or turn off the master switch 18. In some examples, the operation switch 16 is a push switch, and the operation switch 16 is controlled to move to a trigger position to cause the master switch 18 to be triggered and turn on. Conversely, the operation switch 16 is controlled to move away from the master switch 18 such that the master switch 18 switches to the off state. In some another examples, the operation switch 16 is a trigger switch, and the user presses the trigger switch to turn on the master switch 18; and conversely, the trigger switch is released and the master switch 18 switches to the off state.

Although this example relates to the angle grinder 100, it is to be understood that the present application is not limited to the disclosed example and may be applied to other types of electric tools.

Figure 3:
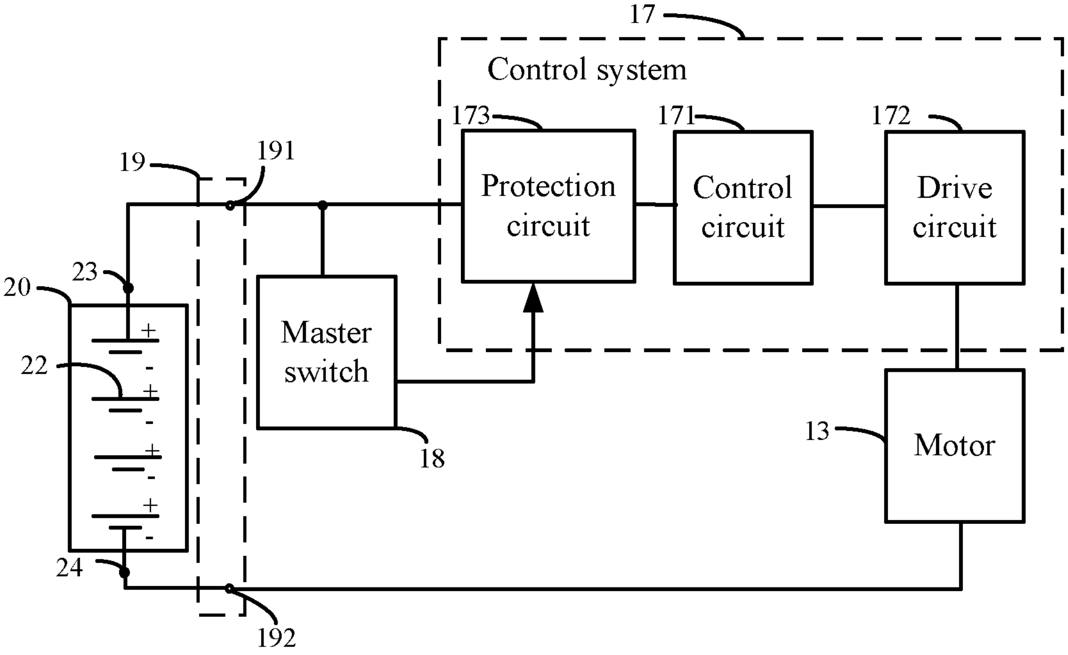
FIG. 3 is a schematic diagram of a control system of the electric tool of FIG. 1 according to an example.

Referring to FIG. 3, a circuit block diagram of a control system of the angle grinder 100. The angle grinder 100 uses a battery pack as the power supply 20. The battery pack serving as the power supply is described as an example, and the battery pack is detachably mounted to the electric tool. The battery pack includes a battery pack case 21 and a battery cell 22. The battery cell 22 is accommodated in the battery pack case 21 and used for storing a capacity, and the battery cell can be repeatedly charged and discharged. The battery pack includes a power supply positive electrode and a power supply negative electrode, and a positive power supply terminal 23 and a negative power supply terminal 24 that can be electrically connected to an external circuit. Therefore, the electric tool includes a tool interface 19 in which a positive tool terminal 191 and a negative tool terminal 192 are provided, and the positive tool terminal 191 and the negative tool terminal 192 are electrically connected to the positive power supply terminal 23 and the negative power supply terminal 24, respectively, to access the electric energy of the battery pack.

The motor 13 is a three-phase brushless motor 13 including a rotor having permanent magnets and three phases stator windings U, V, and W which are steered in an electronic manner. In some examples, the three phases stator windings U, V, and W are connected to each other in a star connection mode. In some another examples, the three phases stator windings U, V, and W are connected to each other in an angle connection mode. However, it is to be understood that other types of brushless motors are also within the scope of this disclosure. The number of stator windings included in the brushless motor may be less than or greater than three phases.

The control system 17 includes a control circuit 171, a drive circuit 172, and a protection circuit 173.

The control circuit 171 is configured to receive electric energy from the power supply 20 and output a drive signal to the drive circuit 172 to control the motor 13 to rotate.

The drive circuit 172 is configured to drive the brushless motor to operate. Under the driving of the drive signal of the control circuit 171, the drive circuit 172 distributes power of a voltage to each phase winding on the stator of the motor 13 according to a certain logical relationship to so that the motor 13 is started and generates continuous torque. Specifically, the drive circuit 172 includes multiple electronic switches. In some examples, the electronic switch includes a field effect transistor (FET). In some other examples, the electronic switch includes an insulated gate bipolar transistor (IG-BT) or the like. A bridge composed of each phase winding of the brushless motor and the electronic switches is electrically connected to the power supply 20.

The master switch 18 is disposed on a current path formed by the tool interface 19 and the protection circuit 173. The master switch 18 has an on state in which electric connection between the tool interface 19 and the control circuit 171 is on and an off state in which the electric connection between the tool interface 19 and the control circuit 171 is off.

The protection circuit 173 is disposed between the master switch 18 and the control circuit 171. In response to the master switch 18 being in the on state before the tool interface 19 connects to the power supply 20, the protection circuit 173 is configured to disconnect the connection between the tool interface 19 and the control circuit 171. Specifically, in a case where the operation switch 16 of the angle grinder 100 is misoperated such that the master switch 18 is triggered and turned on, when the power supply 20 is connected to the electric tool, the protection circuit 173 can disconnect the connection between the tool interface 19 and the control circuit 171. That is to say, in response to the master switch 18 being in the on state before the tool interface 19 connects to the power supply 20, the protection circuit 173 prohibits the power supply 20 from supplying electric energy to the control circuit 171, thereby preventing the control circuit 171 from being powered on; while in response to the master switch 18 being in the on state after the tool interface 19 connects to the power supply 20, the protection circuit 173 conducts the connection between the tool interface 19 and the control circuit 171. Specifically, in a case where the angle grinder 100 is first connected to the power supply 20 and then the master switch 18 is in the on state, the protection circuit 173 is capable of conducting the connection between the tool interface 19 and the control circuit 171. That is to say, when the master switch 18 is in the on state after the tool interface 19 connects to the power supply 20, the protection circuit 173 allows the power supply 20 to supply electric energy to the control circuit 171, so that the control circuit 171 receives the electric energy from the power supply 20, and the control circuit 171 is powered on and outputs a drive signal to the drive circuit 172 to control the motor 13 to rotate.

For the angle grinder 100 of the present example, the operation switch 16 is the push switch. When the user operates the angle grinder 100, the user usually grips the handle part 151 with his hand, pushes the operation switch 16 forward to a start position his thumb, and then releases the thumb and the operation switch 16 is locked in the start position. The operation switch allows the angle grinder 100 to start when the operation switch is located in the start position. In this way, when the user does not use the angle grinder 100, the user may forget to reset the operation switch 16 to an off position. The operation switch prevents the angle grinder 100 from starting when the operation switch is located in the off position. The next time the angle grinder 100 is used again, the battery pack may be directly inserted. At this time, if there is no protection effect of the protection circuit 173, the angle grinder 100 may suddenly start and hurt the user. In this example, when the battery pack is inserted after the operation switch 16 is moved to the start position, the protection circuit 173 can disconnect the tool interface 19 and the control circuit 171, thereby avoiding the wrong start of the angle grinder 100. That is to say, especially for the electric tool in which the operation switch 16 of the present example can be locked in the starting position, it becomes particularly important that the protection circuit 173 can effectively avoid the wrong starting of the electric tool.

Figure 4:
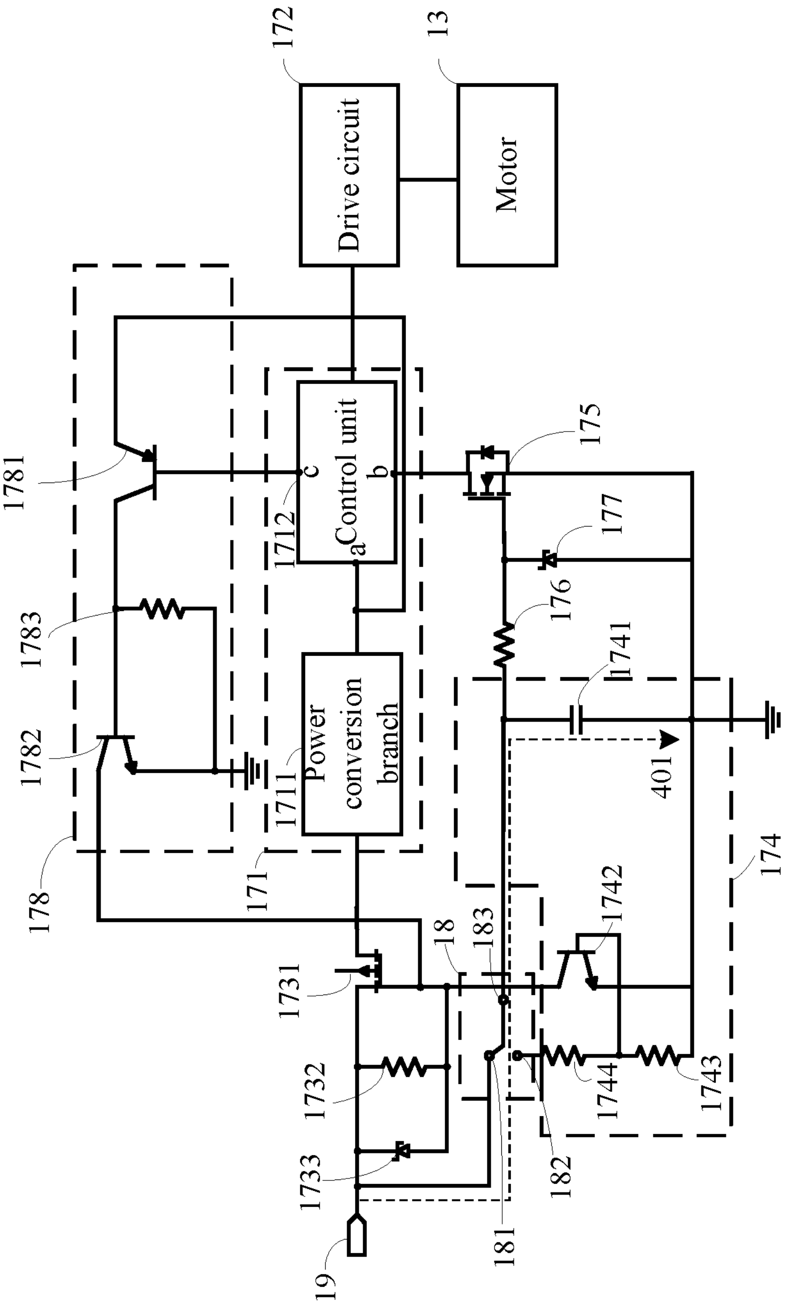
FIG. 4 is a circuit diagram of the control system of FIG. 3 in response to a master switch being in an off state after a tool interface connects to a battery pack.

Referring to FIG. 4, the control circuit 171 further includes, but is not limited to, a power conversion branch 1711 and a control unit 1712.

An input end of the power conversion branch 1711 is connected to the tool interface 19, and an output end of the power conversion branch 1711 is connected to the control unit 1712. The power conversion branch 1711 is configured to convert the electric energy connected to the tool interface 19 into different voltage outputs to supply power to the control unit 1712 and the drive circuit 172, so as to enable the control unit 1712 and the drive circuit 172 to be powered on. In some examples, the power conversion branch 1711 may include one or more direct current to direct current (DC-DC) conversion chips.

After being powered on, the control unit 1712 can output a drive signal to control the drive circuit 172 to operate. In some examples, the control unit 1712 includes a power input terminal a, an enable input terminal b, and a voltage sustain terminal c. The power input terminal a is configured to connect to a voltage provided by the power conversion branch 1711 so as to enable the control unit 1712 to be powered on. The enable input terminal b enables the control unit 1712 to output the drive signal to control the rotation of the motor 13 when a high level is detected. The voltage sustain terminal c is capable of outputting a voltage signal after the control unit 1712 is powered on. In this example, the control unit 1712 may adopt a specified control chip (such as a microcontroller unit (MCU)), and the drive capability for outputting a signal is improved by utilizing a functional circuit such as a power driver unit in the control chip.

As an example of the master switch 18, the master switch 18 includes a first terminal 181, a second terminal 182, and a third terminal 183. In some examples, the master switch 18 is a single-pole double-throw switch. The first terminal 181 of the master switch 18 is configured to be connected to the positive power supply terminal 23 of the battery pack, and the second terminal 182 and the third terminal 183 of the master switch 18 are separately connected to the protection circuit 173. When the first terminal 181 is connected to the third terminal 183, the master switch 18 is in an off state. When the third terminal 183 is connected to the second terminal 182, the master switch 18 is in an on state. Therefore, when the master switch 18 is in the off state after the tool interface 19 connects to the battery pack, the first terminal 181 of the master switch 18 is connected to the third terminal 183 of the master switch 18, and the protection circuit 173 is powered on; and when the master switch 18 is in the on state after the tool interface 19 connects to the battery pack, the connection between the battery pack and the control circuit 171 is turned on, so that the control circuit 171 receives electric energy from the battery pack, and the control circuit 171 is powered on and outputs a drive signal to the drive circuit 172 to control the motor 13 to rotate.

In some examples, the protection circuit 173 further includes a first switching element 1731, a first resistor 1732, and a first Zener diode 1733. The first switching element 1731 is connected in series between the tool interface 19 and the control circuit 171. The first switching element 1731 can turn on or turn off the connection between the tool interface 19 and the control circuit 171. Specifically, the first resistor 1732 and the first Zener diode 1733 are connected in parallel to a gate electrode G and a source electrode S of the first switching element 1731, and the source electrode S and a drain electrode D of the first switching element 1731 are connected to the positive power supply terminal 23 of the battery pack and the input end of the power conversion branch 1711, respectively.

The protection circuit 173 further includes a first power supply branch 174. As a circuit example of the first power supply branch 174, the first power supply branch 174 includes a capacitor 1741, a first triode 1742, a second resistor 1743, and a third resistor 1744, and these electronic components are connected together in an associated manner to form the first power supply branch 174.

A collector electrode of the first triode 1742 is connected to the gate electrode G of the first switching element 1731, and an emitter electrode of the first triode 1742 is connected to ground. The second resistor 1743 is connected in parallel to a base electrode and the emitter electrode of the first triode 1742. One end of the third resistor 1744 is connected to the second terminal 182 of the master switch 18, and another end of the third resistor 1744 is connected to the base electrode of the first triode 1742. One end of the capacitor 1741 is connected to the third terminal 183 of the master switch 18, and another end of the capacitor 1741 is connected to the ground.

The protection circuit 173 further includes a second switching element 175, a fourth resistor 176, and a second Zener diode 177. One end of the second switching element 175 is electrically connected to the enable input terminal b of the control unit 1712. In response to the second switching element 175 turning on, the enable input terminal b detects a low level. Specifically, a drain electrode d of the second switching element 175 is connected to the enable input terminal b of the control unit 1712, and a source electrode S of the second switching element 175 is connected to the ground. The second Zener diode 177 is connected in parallel to a gate electrode G and the source electrode S of the second switching element 175. One end of the fourth resistor 176 is connected to one end of the capacitor 1741, and another end of the fourth resistor 176 is connected to the gate electrode G of the second switching element 175.

Therefore, when the master switch 18 is in the off state after the tool interface 19 connects to the power supply 20, the first terminal 181 and the third terminal 183 of the master switch 18 are connected to each other, and the current flows through the positive power supply terminal 23, and sequentially through the master switch 18 and the capacitor 1741 to charge the capacitor 1741; and a current path is shown by the arrow 401. At the same time, a voltage of the gate electrode G of the second switching element 175 is pulled high so that the second switching element 175 is turned on, connection between the enable input terminal and the ground is turned on, and the enable input terminal b of the control unit 1712 detects a low level.

Figure 5:
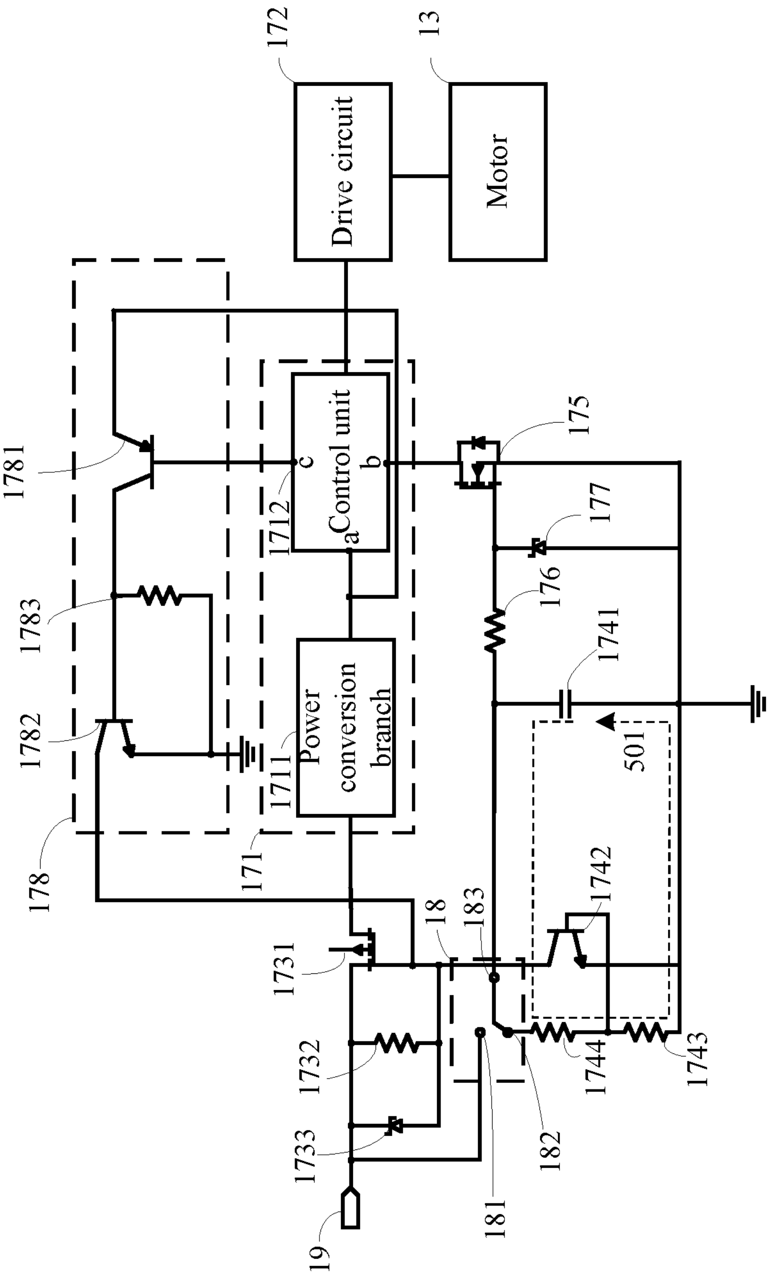
FIG. 5 is a circuit diagram of the control system of FIG. 3 in response to a master switch being in an on state after a tool interface connects to a battery pack.

Referring to FIG. 5, when the master switch 18 is in the on state after the tool interface 19 connects to the battery pack, that is, when the operation switch 16 is pressed after the tool interface 19 connects to the battery pack, the master switch 18 switches from the off state to the on state (a normal on state), the third terminal 183 and the second terminal 182 of the master switch 18 are connected to each other, the capacitor 1741 starts to discharge, and the first triode 1742 is turned on, so that the first switching element 1731 is turned on. As a result, the tool interface 19 is connected to the control circuit 171, and the control circuit 171 is powered on. Specifically, a current flowing out of a high-voltage terminal of the capacitor 1741 sequentially passes through the master switch 18, the third resistor 1744, and the second resistor 1743 and back to a low-voltage terminal of the capacitor 1741 to form a current loop, and the current path is shown by the arrow 501. Due to discharge of the capacitor 1741, a voltage of the base electrode of the first triode 1742 is pulled up so that the first triode 1742 is turned on, and the turn-on of the first triode 1742 causes a voltage of the gate electrode G of the first switching element 1731 to be pulled down so that the first switching element 1731 is also turned on. As a result, the connection between the tool interface 19 and the control circuit 171 is turned on, and the control circuit 171 is powered on.

However, the discharge of the capacitor 1741 of the first power supply branch can only last for a certain period of time, and in order to maintain the continuous turn-on of the first switching element 1731, the protection circuit 173 is further provided with a second power supply branch 178. The second power supply branch 178 is connected in series between the control circuit 171 and the first switching element 1731. The second power supply branch 178 can maintain the turn-on of the first switching element 1731 when the master switch 18 is in the on state after the tool interface 19 connects to the power supply 20. Specifically, when the master switch 18 is in the on state after the tool interface 19 connects to the power supply 20, the second power supply branch 178 enables a first voltage terminal of the first switching element 1731 to receive a low level to maintain the turn-on of the first switching element 1731.

Figure 6:
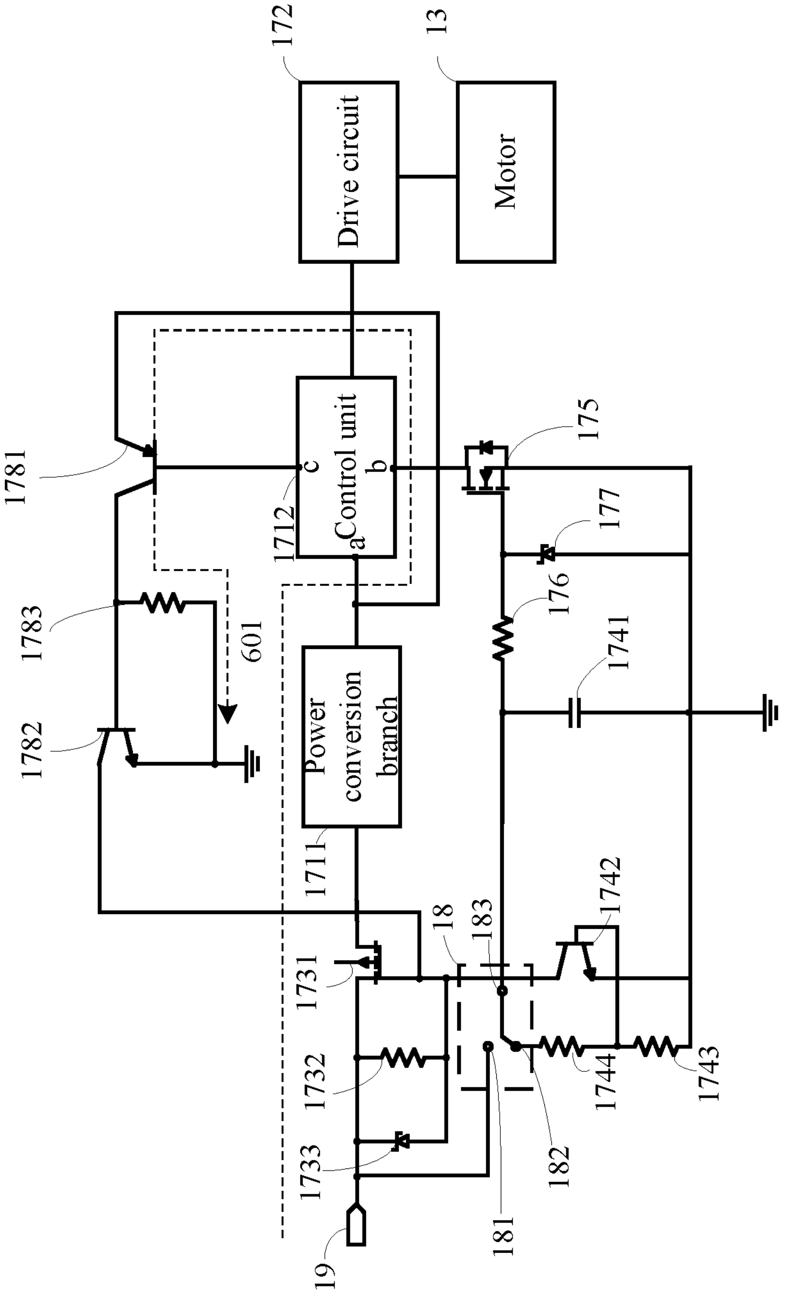
FIG. 6 is another circuit diagram of the control system of FIG. 3 in response to a master switch being in an on state after a tool interface connects to a battery pack.

As a circuit example of the second power supply branch 178, referring to FIG. 6, the second power supply branch 178 includes a second triode 1781, a third triode 1782, and a fifth resistor 1784, and these electronic components are connected together in an associated manner to form the second power supply branch 178.

A base electrode of the second triode 1781 is connected to the voltage sustain terminal c of the control unit 1712, an emitter electrode of the second triode 1781 is connected to the output end of the power conversion branch 1711, and a collector electrode of the second triode 1781 is connected to a base electrode of the third triode 1782. The fifth resistor 1784 is connected in parallel to an emitter electrode and the base electrode of the third triode, a collector electrode of the third triode 1782 is connected to the gate electrode G of the first switching element 1731, and the emitter electrode of the third triode 1782 is connected to the ground.

Therefore, after the first power supply branch 174 causes the first switching element 1731 to turn on the connection between the tool interface 19 and the control circuit 171, the control unit 1712 is powered on, and the voltage sustain terminal of the control unit 1712 outputs a voltage signal; and after the second power supply branch 178 receives the voltage signal of the voltage sustain terminal c and a voltage at the output end of the power conversion branch 1711, the second triode is turned on and the third triode 1782 is turned on, thereby maintaining the turn-on of the first switching element 1731. In a current path shown by the arrow 601, the current flows through the positive power supply terminal 23, and sequentially through the power conversion branch 1711, the second triode 1781, and the fifth resistor 1784. Since a voltage of the base electrode of the second triode 1781 is pulled up, the second triode 1781 is turned on, and thus a voltage of the base electrode of the third transistor 1782 is pulled up and the third triode 1782 is turned on. In this manner, the voltage of the gate electrode G of the first switching element 1731 is pulled down, so that the first switching element 1731 is kept on, and the connection between the tool interface 19 and the control circuit 171 is kept on and the control circuit 171 is powered on. Moreover, since the discharge of the capacitor 1741 is completed and a voltage of the gate electrode of the second switching element 175 is not pulled up, the second switching element 175 is turned off. Therefore, the connection between the enable input terminal b of the control unit 1712 and the ground is turned off, so that a voltage of the enable input terminal b of the control unit 1712 is increased and the control unit 1712 can output a drive signal to the motor 13 to control the rotation of the motor 13.

However, when the master switch 18 is in the on state before the tool interface 19 connects to the power supply 20, that is, when the master switch 18 of the electric tool is triggered to be turned on first and then the battery pack is inserted (in an abnormal state), and as shown in FIG. 5, in a case where the third terminal 183 and the second terminal 182 of the master switch 18 are connected to each other first and then the battery pack is inserted, the capacitor 1741 is not powered on at this time and the first triode is turned off. Even if the battery pack is inserted into the electric tool, since the current path indicated by the arrow 401 does not exist, the capacitor 1741 cannot be powered on so that the first triode 1742 is in the off state and the first switching element is also in the off state. In this manner, the electric connection between the power supply 20 and the control circuit 171 is disconnected by the first switching element, so that the control circuit 171 cannot be powered on.

In the preceding electric tool, the first power supply branch and the second power supply branch are provided, the power supply to the control circuit 171 by the power supply 20 is controlled, and when the master switch 18 is in the on state after the tool interface 19 connects to the power supply 20, that is, the electric tool firstly connects to the battery pack and then the operation switch 16 is triggered, the control circuit 171 can only be powered on to output the signal to the drive circuit 172 and the drive circuit 172 drives the brushless motor 13 to operate. In this manner, the problem of mistakenly triggering in a case where the operation switch 16 is triggered to be turned on firstly and then connects to the power supply 20 is avoided, thereby improving the safety performance of the electric tool.

Figure 7:
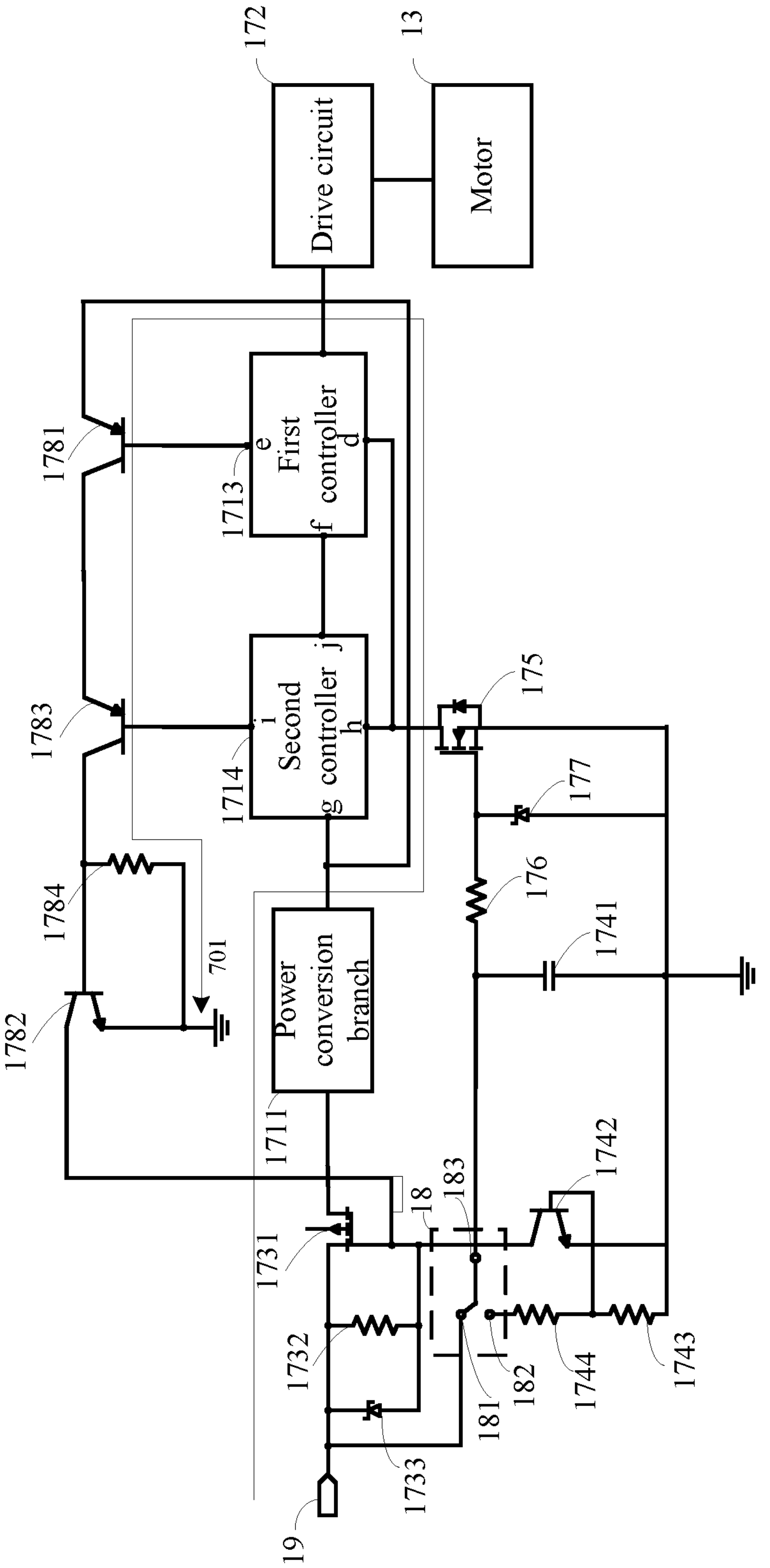
FIG. 7 is another circuit diagram of the control system of FIG. 3.

In another example, referring to FIG. 7, the control unit 1712 further includes a first controller 1713 and a second controller 1714, and the first controller 1713 and the second controller 1714 are communicatively connected to each other. The first controller 1713 is connected to the motor 13 to control the rotation of the motor 13, and the second controller 1714 outputs a trigger signal to the first controller to enable the first controller to output a drive signal to control the rotation of the motor 13 when the master switch 18 is in the on state after the tool interface 19 connects to the power supply 20.

Specifically, the first controller 1713 includes a first power supply input terminal, a first enable input terminal d, a first voltage sustain terminal e, and a first communication terminal f; and the second controller 1714 includes a second power supply input terminal g, a second enable input terminal h, a second voltage sustain terminal i, and a second communication terminal j. The second power supply input terminal g is configured to connect to a voltage provided by the power conversion branch 1711 to enable the second controller 1714 to be powered on, and the second enable input terminal b is capable of enabling the second communication terminal to output the trigger signal to the first controller 1713 when a high level is detected. Specifically, the second enable input terminal is capable of enabling the second communication terminal to output the trigger signal to the first communication terminal when a high level is detected; and the second voltage sustain terminal i is capable of outputting a voltage signal after the second controller 1714 is powered on. The first power supply input terminal 1713*a* of the first controller 1713 is configured to connect to a voltage provided by the power conversion branch 1711 so as to enable the first controller 1713 to be powered on. The first voltage sustain terminal e can output a voltage signal after the first controller 1713 is powered on. The first enable input terminal e can enable the first controller 1713 to output the drive signal to the drive circuit 172 to control the rotation of the motor 13 when a high level is detected and the first communication terminal receives the trigger signal from the second controller 1714.

Thus, since the control unit 1712 includes the first enable input terminal e and the second enable input terminal i, the second power supply branch 178 needs to be provided with two triodes, that is, the second power supply branch 178 includes a second triode 1781 and a fourth triode 1783. Specifically, a base electrode of the second triode 1781 is connected to the first voltage sustain terminal e of the first controller 1713, an emitter electrode of the second triode 1781 is connected to an output end of the power conversion branch 1711, a collector electrode of the second triode 1781 is connected to an emitter electrode of the fourth triode 1783, a base electrode of the fourth triode 1783 is connected to the second voltage sustain terminal i of the second controller 1714, and a collector electrode of the fourth triode 1783 is connected to a base electrode of the third triode 1782. The fifth resistor 1783 is connected in parallel to an emitter electrode and a base electrode of the third triode 1782, the collector electrode of the third triode 1782 is connected to the gate electrode G of the first switching element 1731, and the emitter electrode of the third triode 1782 is connected to the ground.

Therefore, after the first power supply branch 174 causes the first switching element 1731 to turn on the connection between the tool interface 19 and the control circuit 171, the first controller 1713 and the second controller 1714 are powered on, and the first voltage sustain terminal e and the second voltage sustain terminal i output voltage signals; and after the second power supply branch 178 receives the voltage signals of the voltage sustain terminals and a voltage at the output end of the power conversion branch 1711, the second triode 1781 is turned on, the fourth triode 1783 is turned on, and the third triode 1782 is turned on, thereby maintaining the turn-on of the first switching element 1731. In a current path shown by the arrow 701, the current flows through the positive power supply terminal 23, and sequentially through the power conversion branch 1711, the second triode 1781, the fourth triode 1783, and the fifth resistor 1783. Since a voltage of the base electrode of the second triode 1781 is pulled up, the second triode 1781 is turned on, and the since a voltage of the base electrode of the fourth triode 1783 is pulled up, the fourth triode 1783 is turned on, and thus a voltage of the base electrode of the third transistor 1782 is pulled up and the third triode 1782 is turned on. In this manner, the voltage of the gate electrode G of the first switching element 1731 is pulled down, so that the first switching element 1731 is kept on, and the connection between the tool interface 19 and the control circuit 171 is kept on and the control circuit 171 is powered on.

In an example, the first enable input terminal d and the second enable input terminal h are both connected to the drain electrode of the second switching element 175. Thus, when the control circuit 171 is powered on and the second switching element 175 is turned off, the connection between the first enable input terminal d and the ground is turned off, and similarly the connection between the second enable input terminal h and the ground is also turned off, so that voltages of the first enable input terminal d and the second enable input terminal h are increased, thus causing the first controller 1713 to output the drive signal to the motor 13 to control the rotation of the motor 13.

The preceding manner in which the first controller 1713 and the second controller 1714 are controlled may be configured as a simple manner in which a hardware structure is provided to control the power supply to the control circuit 171, so that the logic AND is achieved. That is to say, the brushless motor 13 can be driven to operate only when two controllers are triggered, and when any one of the two controllers fails, the brushless motor 13 cannot be driven to rotate, thereby improving the reliability of the control system.

The preceding illustrates and describes basic principles, main features and advantages of the present invention. It is to be understood by those skilled in the art that the preceding examples do not limit the present invention in any form, and solutions obtained by means of equivalent substitution or equivalent transformation fall within the scope of the present invention.

What is claimed is:

1. An electric tool, comprising:
a housing;
a motor disposed in the housing;
a tool interface configured to connect to a power supply to the motor;
a control system comprising a control circuit and configured to control a rotation of the motor; and
a master switch disposed on a current path formed by the tool interface and the control system;
wherein the master switch has an on state in which electric connection between the tool interface and the control circuit is in an off state in which the electric connection between the tool interface and the control circuit is off, the control system comprises a protection circuit connected between the master switch and the control circuit, and the protection circuit is configured to disconnect connection between the tool interface and the control circuit in response to the master switch being in the on state before the tool interface connects to the power supply,
wherein the protection circuit comprises a first power supply branch, the first power supply branch comprises a capacitor electrically connected to the master switch, and the capacitor is not powered on in response to the master switch being in the on state before the tool interface connects to the power supply,
wherein the capacitor is powered on in response to the master switch being in the off state after the tool interface connects to the power supply and the capacitor is configured to discharge in response to the master switch being in the on state after the tool interface connects to the power supply, and
wherein the first power supply branch further comprises a first triode, at least one end of the first triode is connected to the capacitor, and the first triode is configured to turn on in response to the capacitor discharging.

2. The electric tool of claim 1, wherein the protection circuit is configured to conduct the connection between the tool interface and the control circuit in response to the master switch being in the on state after the tool interface connects to the power supply.

3. The electric tool of claim 1, wherein the protection circuit further comprises a first switching element, one end of the first switching element is connected to the first triode, and the first switching element is in an on state in response to the first triode being on.

4. The electric tool of claim 3, wherein the protection circuit further comprises a second power supply branch connected in series between the control circuit and the first switching element and the second power supply branch is configured to maintain that the first switching element is on in response to the master switch being in the on state after the tool interface connects to the power supply.

5. The electric tool of claim 4, wherein the second power supply branch enables a first voltage terminal of the first switching element to receive a low level to maintain that the first switching element is on in response to the master switch being in the on state after the tool interface connects to the power supply.

6. The electric tool of claim 5, wherein the control circuit further comprises a voltage sustain terminal configured to output a voltage signal in response to the first switching element being on, the second power supply branch comprises a second triode and a third triode, one end of the second triode is connected to the voltage sustain terminal, the second triode is configured to turn on in response to receiving the voltage signal, one end of the third triode is connected to one end of the second triode, and the third triode is configured to turn on in response to the second triode turning on.

7. The electric tool of claim 6, wherein one end of the first switching element is connected to the third triode and the first switching element is in the on state in response to the third triode turning on.

8. The electric tool of claim 1, wherein the control circuit comprises a power conversion branch connected to the tool interface and configured to convert electric energy connected to the tool interface into different voltage outputs.

9. The electric tool of claim 8, wherein the control circuit further comprises a control unit and the control unit is configured to receive electric energy from the power conversion branch and output a drive signal to control the rotation of the motor.

10. The electric tool of claim 9, wherein the control unit comprises a power input terminal configured to connect to a voltage provided by the power conversion branch and an enable input terminal configured to output drive to control the motor to rotate in response to detecting a high level, the protection circuit comprises a second switching element, one end of the second switching element is electrically connected to the enable input terminal, and the enable input terminal detects a low level in response to the second switching element turning on.

11. The electric tool of claim 9, wherein the control unit comprises a first controller connected to the motor and configured to control the rotation of the motor, the control unit further comprises a second controller, the second controller is communicatively connected to the first controller, and the second controller is configured to output a trigger signal to the first controller to enable the first controller to output a drive signal to control the rotation of the motor in response to the master switch being in the on state after the tool interface connects to the power supply.

12. The electric tool of claim 1, wherein the electric tool further comprises an operation switch for turning on or turning off the master switch and the operation switch is a push switch being operated by a user to slide along a surface of the housing.

13. The electric tool of claim 12, wherein the operation switch is movable to a start position that allows the electric tool to start and an off position that prevents the electric tool from starting and the operation switch is capable of being locked in the start position.

14. An angle grinder, comprising:

a housing;

a motor disposed in the housing;

a tool interface configured to connect to a power supply to the motor;

a control system comprising a control circuit and configured to control a rotation of the motor; and a master switch disposed on a current path formed by the tool interface and the control system;

wherein the master switch has an on state in which electric connection between the tool interface and the control circuit is on and an off state in which the electric connection between the tool interface and the control circuit is off, the control system comprises a protection circuit connected between the master switch and the control circuit, and the protection circuit is configured to disconnect connection between the tool interface and the control circuit in response to the master switch being in the on state before the tool interface connects to the power supply, and wherein a first power supply branch further comprises a first triode, at least one end of the first triode is connected to a capacitor, and the first triode is configured to turn on in response to a discharge of the capacitor.

15. The angle grinder of claim 14, wherein the protection circuit is configured to conduct the connection between the tool interface and the control circuit in response to the master switch being in the on state after the tool interface connects to the power supply.

16. The angle grinder of claim 14, wherein the protection circuit comprises the first power supply branch, the capacitor of the first power supply branch is electrically connected to the master switch, and the capacitor is not powered on in response to the master switch being in the on state before the tool interface connects to the power supply.

17. The angle grinder of claim 14, wherein the angle grinder further comprises an operation switch for turning on or turning off the master switch, the operation switch is a push switch being operated by a user to slide along a surface of the housing, the operation switch is movable to a start position that allows the angle grinder to start and an off position that prevents the angle grinder from starting, and the operation switch is capable of being locked in the start position.

* * * * *